United States Patent
Noda et al.

(10) Patent No.: US 8,205,077 B2
(45) Date of Patent: Jun. 19, 2012

(54) MANAGEMENT APPARATUS

(75) Inventors: Bintatsu Noda, Kawasaki (JP);
Masahiko Takenaka, Kawasaki (JP);
Takayuki Hasebe, Kawasaki (JP);
Takeaki Terada, Kawasaki (JP);
Takashi Yoshioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 351 days.

(21) Appl. No.: 12/363,879

(22) Filed: Feb. 2, 2009

(65) Prior Publication Data
US 2009/0205029 A1    Aug. 13, 2009

(30) Foreign Application Priority Data
Feb. 1, 2008 (JP) ................... 2008-023262

(51) Int. Cl.
*G06F 21/00* (2006.01)
(52) U.S. Cl. ............... 713/165; 726/17; 726/21; 726/28
(58) Field of Classification Search .................... 726/18, 726/19, 21, 26–30; 707/726, 999.009; 713/165
See application file for complete search history.

(56) References Cited

U.S. PATENT DOCUMENTS

| | | | |
|---|---|---|---|
| 5,408,082 A * | 4/1995 | Takagi et al. ................. | 235/492 |
| 5,414,844 A * | 5/1995 | Wang ............................. | 726/21 |
| 6,341,340 B1 * | 1/2002 | Tsukerman et al. .......... | 711/150 |
| 2002/0042795 A1 * | 4/2002 | Smith ........................... | 707/201 |
| 2002/0116382 A1 | 8/2002 | Koyama et al. | |
| 2008/0120415 A1 * | 5/2008 | Chen et al. .................... | 709/226 |

FOREIGN PATENT DOCUMENTS

| JP | 2001-167016 A | 6/2001 |
|---|---|---|
| JP | 2002-244927 A | 8/2002 |

* cited by examiner

*Primary Examiner* — Jung Kim
*Assistant Examiner* — Ngoc D Nguyen
(74) *Attorney, Agent, or Firm* — Fujitsu Patent Center

(57) ABSTRACT

A management apparatus comprising memory to store owner information, dependence relationship information, and authorized user information are associated with file information identifying the secret file, an authorized user determination unit to determine whether a source user of the browse request is registered as the authorized user of the browse request file, a dependent file specifying unit to specify a dependent file having a dependence relationship with the browse request file by referring to the dependence relationship information when the source user is authorized; and a browse permission response transmitting unit to transmit the browse permission response to the source user based on whether or not the source user is registered as the authorized user of the dependent file by referring to the authorized user information.

4 Claims, 9 Drawing Sheets

| FILE INFORMATION | OWNER INFORMATION | DEPENDENCE RELATIONSHIP INFORMATION | AUTHORIZED USER INFORMATION |
|---|---|---|---|
| FILE A | USER X |  | USER X, USER Y |
| FILE B | USER Y |  | USER Y |
| FILE C | USER Y | FILE A, FILE B | USER X, USER Y |

FIG. 3

| FILE INFORMATION | OWNER INFORMATION | DEPENDENCE RELATIONSHIP INFORMATION | AUTHORIZED USER INFORMATION |
|---|---|---|---|
| FILE A | USER X | | USER X, USER Y |
| FILE B | USER Y | | USER Y |
| FILE C | USER Y | FILE A, FILE B | USER X, USER Y |

MANAGEMENT APPARATUS

CROSS-REFERENCE TO RELATED APPLICATIONS

This application is based upon and claims the benefit of priority from the prior Japanese Patent Application No. 2008-23262 filed on Feb. 1, 2008, the entire contents of which are incorporated herein by reference.

BACKGROUND OF THE INVENTION

1. Field of the Invention

The present invention relates to a management apparatus.

2. Description of the Related Art

There is a management apparatus which manages browse and utilization of an access-restricted (hereafter secret) file (for example, see Japanese Patent Application Laid-Open Nos. 2001-167016 and 2002-244927). FIG. 9 is a diagram explaining an outline of a conventional management apparatus. As shown by an arrow (1) in FIG. 9, a conventional management apparatus accepts a request to register a secret file received from a predetermined user (for example, user X), and the management apparatus stores dependence relationship information and authorized user information in a storage unit and associates the dependence relationship information and authorized user information to the file information. The secret file includes the file information used to identify the secret file, the dependence relationship information indicating a dependence relationship between the secret file and other secret files, and the authorized user information used to identify an authorized user who should be permitted to browse the secret file.

As shown by an arrow (2) in FIG. 9, when accepting a request to browse the secret file from a predetermined user (for example, user Y), the conventional management apparatus refers to authorized user information associated with the file information on the browse request file, and determines whether or not the source user of the browse request is registered as an authorized user of the browse request file.

Then, when the source user is registered as the authorized user, the conventional management apparatus refers to the dependence relationship information associated with the file information on the browse request file, and specifies a dependent file having the dependence relationship with the browse request file.

Then the conventional management apparatus refers to the authorized user information associated with the file information on the specified dependent file, and determines whether or not the source user of the browse request is registered as the authorized user of the dependent file.

When the source user of the browse request is registered as the authorized user of the dependent file, as shown by an arrow (3) in FIG. 9, the conventional management apparatus transmits information (for example, encryption key used to decrypt the encrypted secret text) necessary to browse the browse request file which is a browse permission response to the source user.

SUMMARY

According to an aspect of the present invention, there is provided a management apparatus, comprising: a memory to store owner information, dependence relationship information, and authorized user information are associated with file information identifying the secret file; an authorized user determination unit to determine whether a source user of the browse request is registered as the authorized user of the browse request file; a dependent file specifying unit to specify a dependent file having a dependence relationship with the browse request file by referring to the dependence relationship information when the source user is authorized; and a browse permission response transmitting unit to transmit the browse permission response to the source user based on whether or not the source user is registered as the authorized user of the dependent file by referring to the authorized user information.

Additional objects and advantages of the invention will be set forth in part in the description which follows, and in part will be obvious from the description, or may be learned by practice of the invention. The object and advantageous of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 3 shows an example of information stored in an identification information storage unit;

DETAILED DESCRIPTION OF THE PREFERRED EMBODIMENTS

In the conventional technique described above, sometimes a browse permission response cannot be transmitted even if the browse request is accepted from a user who should be permitted to browse the secret file.

For example, in the conventional technique, in the case where a secret file C is produced using a secret file A for which a user X and a user Y are permitted to browse and a secret file B which the user Y is permitted to browse, when the user X and the user Y should be permitted to browse the secret file C, the browse permission response could not be transmitted in response to the browse request accepted from the user X who is not permitted to browse the secret file B.

Therefore, the inventor invented a management apparatus and a management program which can transmit the browse permission response to a user who should be permitted to browse the secret file.

The embodiments of a management apparatus according to the invention will be described below in detail with reference to the accompanying drawings. Hereinafter, a management apparatus (for example, access right management server) to which the invention is applied will be described as an embodiment.

First Embodiment

An outline and a feature of a management apparatus according to a first embodiment, a configuration of the management apparatus, a flow of processing performed by the management apparatus, and an effect of the first embodiment are sequentially described below.

Outline and Feature of Management Apparatus of the First Embodiment

The outline and feature of the management apparatus of the first embodiment will be described with reference to FIG. 1. FIG. 1 is a diagram explaining the outline and feature of the management apparatus of the first embodiment.

Roughly the management apparatus of the first embodiment accepts a browse request from a user to manage the browse of a secret file, and the management apparatus transmits information necessary to browse the secret file as a browse permission response to the authorized user who should be permitted to browse the secret file.

The management apparatus of the first embodiment has the main feature in which a user who should be permitted to browse the secret file is identified based on an owner of the secret file.

Figures 1A, 1B:
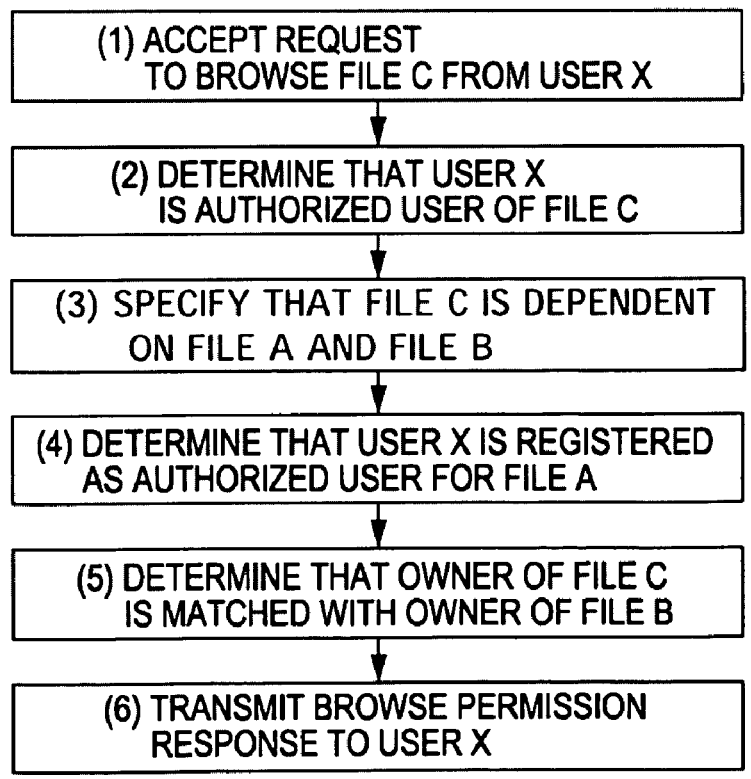
FIGS. 1A-1B are diagrams explaining an outline and a feature of a management apparatus according to a first embodiment of the invention.

That is, as shown in FIG. 1A, in the management apparatus of the first embodiment, owner information used to identify the owner of the secret file, dependence relationship information indicating a dependence relationship between the secret file and other secret files, and authorized user information used to identify an authorized user are stored in association with file information used to identify the secret file.

The management apparatus of the first embodiment refers to the authorized user information for the file targeted by the browse request among the pieces of stored authorized user information, and determines whether or not a source user of the browse request is registered as an authorized user of the browse request file.

When the source user is registered as an authorized user, the management apparatus of the first embodiment refers to the dependence relationship information for the file targeted by the browse request, and specifies a dependent file having the dependence relationship with the browse request file.

The management apparatus of the first embodiment transmits the browse permission response to the source user of the browse request based on whether or not the source user is registered as the authorized user of the dependent file by referring to the authorized user information associated with the file information and/or whether or not the owner information on the browse request file is matched with the owner information on the specified dependent file by referring to the stored owner information.

Specifically, for example, the following pieces of information are stored in the management apparatus of the first embodiment. That is, a user X is an owner of a file A, the file A has no dependence relationship with other files, and the user X and a user Y are permitted to browse the file A (see FIG. 1A).

The following pieces of information are also stored in the management apparatus of the first embodiment. That is, the user Y is an owner of a file B, the file B has no dependence relationship with other files, and the user Y is permitted to browse the file B (see FIG. 1A).

The following pieces of information are also stored in the management apparatus of the first embodiment. That is, the user Y is an owner of a file C, the file C has a dependence relationship with the file A and file B namely, the file C is produced using the file A and file B, and the user X and the user Y are permitted to browse the file C (see FIG. 1A).

When the management apparatus of the first embodiment accepts a request to browse the file C from the user X (see (1) of FIG. 1B), the management apparatus of the first embodiment determines that the user X is the authorized user of the file C (see (2) of FIG. 1B), and specifies that the file C is dependent on the file A and the file B (see (3) of FIG. 1B).

Then the management apparatus of the first embodiment determines that the user X is registered as the authorized user of the file A (see (4) of FIG. 1B), determines that the owner of the file C is matched with the owner of the file B with respect to the file B (see (5) of FIG. 1B), and transmits the browse permission response to the user X (see (6) of FIG. 1B).

Thus, the management apparatus of the first embodiment identifies the user who should be permitted to browse the secret file based on the owner of the secret file, so that the management apparatus of the first embodiment can transmit the browse permission response to the user who should be permitted to browse the secret file.

Configuration of Management Apparatus

Figure 2:
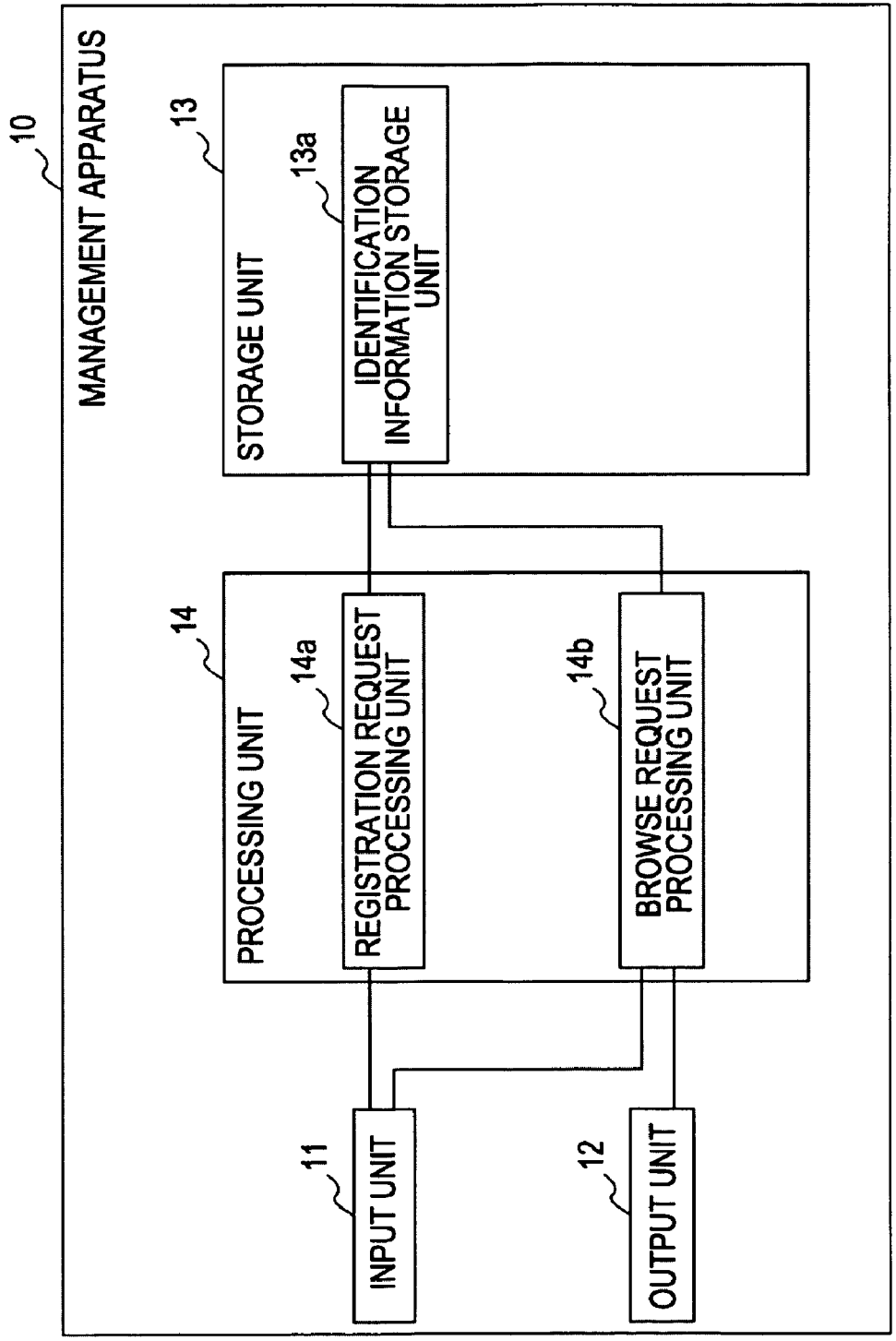
FIG. 2 is a block diagram showing a configuration of the management apparatus of the first embodiment.

The configuration of the management apparatus will be described with reference to FIGS. 2 and 3. FIG. 2 is a block diagram showing the configuration of the management apparatus. FIG. 3 shows an example of information stored in an identification information storage unit. As shown in FIG. 2, a management apparatus 10 includes an input unit 11, an output unit 12, and a storage unit 13, and a processing unit 14.

The input unit 11 accepts inputs of various pieces of information. Specifically, the input unit 11 includes a keyboard, a mouse, a microphone, and an input port, and the input unit 11 accepts a request to register the secret file and a request to browse the secret file from the user.

The output unit 12 outputs various pieces of information. Specifically the output unit 12 includes a monitor (or display or touch panel), a speaker, and an input port, and the output unit 12 transmits the browse permission response to the source user of the browse request.

Data and a program, which are necessary for various pieces of processing performed by the processing unit 14, are stored in the storage unit 13. As one closely related to the present invention in particular, the storage unit 13 includes an identification information storage unit 13*a*.

As shown in FIG. 3, the owner information (for example, user X) which is used to identify the owner of the secret file (for example, file A), the dependence relationship information (for example, file A and file B) indicating the dependence relationship between the secret file and other secret files, and the authorized user information (for example, user X and user Y) used to identify the authorized user are stored in the identification information storage unit 13*a*.

Referring to an example shown in FIG. 3, the following pieces of information are stored in the identification information storage unit 13*a*. That is, the user X is the owner of the file A, the file A has no dependence relationship with other files, and the user X and the user Y are permitted to browse the file A.

The following pieces of information are also stored in the identification information storage unit 13*a*. That is, the user Y is the owner of the file B, the file B has no dependence relationship with other file, and the user Y is permitted to browse the file B.

The following pieces of information are also stored in the identification information storage unit 13*a*. That is, the user Y is the owner of the file C, the file C has a dependence relationship with the file A and file B, namely, the file C is produced using the file A and file B, and the user X and the user Y are permitted to browse the file C.

The processing unit 14 includes an internal memory. A control program such as OS (Operating System), programs in which various processing procedures are defined, and necessary data are stored in the internal memory. The processing unit 14 performs various pieces of processing using the programs and data. As ones closely related to the present invention in particular, the processing unit 14 includes a registration request processing unit 14*a* and a browse request processing unit 14*b*.

When the registration request processing unit 14*a* accepts the request to register the secret file including the file information, owner information, dependence relationship information, and authorized user information from a predetermined user through the input unit 11, the file information is stored in the identification information storage unit 13*a*, and the owner information, dependence relationship information, and authorized user information are stored in the identification information storage unit 13*a* associated with the file information.

When the browse request is accepted, the browse request processing unit 14*b* transmits the browse permission response to the authorized user who should be permitted to browse the secret file.

Specifically, when accepting the request to browse the secret file including the file information on the browse request file from a predetermined user through the input unit 11, the browse request processing unit 14*b* refers to the authorized user information associated with the file information of the file targeted by the browse request stored in the identification information storage unit 13*a*, and determines whether or not the source user of the browse request is registered as the authorized user of the browse request file.

At this point, the browse request processing unit 14*b* directly ends the processing when the source user is not registered as the authorized user of the browse request file.

On the other hand, when the source user is registered as the authorized user, the browse request processing unit 14*b* refers to the dependence relationship information which is stored in the identification information storage unit 13*a* in association with the file information for the file targeted by the browse request file, and specifies the dependent file having the dependence relationship with the browse request file.

Then the browse request processing unit 14*b* transmits the browse permission response to the source user based on whether or not the source user of the browse request is registered as the authorized user of the specified dependent file by referring to the authorized user information associated with the file information for the specified dependent file and stored in the identification information storage unit 13*a* and/or whether or not the owner information on the browse request file is matched with the owner information on the specified dependent file by referring to the owner information stored in the identification information storage unit 13*a*.

Specifically, the browse request processing unit 14*b* refers to the authorized user information stored in the identification information storage unit 13*a*, and determines whether or not the owner information on the browse request file is matched with the owner information on the specified dependent file.

When the owner information on the browse request file is not matched with the owner information on the specified dependent file, the browse request processing unit 14*b* determines whether or not the source user of the browse request is registered as the authorized user of the dependent file.

When the owner information on the browse request file is matched with the owner information on the specified dependent file, or when the source user of the browse request is registered as the authorized user of the dependent file, the browse request processing unit 14*b* transmits the browse permission response to the source user.

On the other hand, when the owner information on the browse request file is not matched with the owner information on the specified dependent file, and when the source user of the browse request is not registered as the authorized user of the dependent file, the processing is directly ended.

Specifically, for example, when the request to browse the file C is accepted from the user X, the browse request processing unit 14*b* refers to the authorized user information associated with the file information on the file C, and determines that the user X is registered as the authorized user of the file C.

Then the browse request processing unit 14*b* refers to the dependence relationship information associated with the file information on the file C, and specifies the file A and file B having the dependence relationship with the file C.

Then the browse request processing unit 14*b* refers to the owner information associated with the file information on the file A, and determines that the "user Y" which is the owner information on the file C is not matched with the "user X" which is the owner information on the file A. The browse request processing unit 14*b* refers to the authorized user information associated with the file information on the file A, and determines that the user X is registered as the authorized user of the file A.

The browse request processing unit 14*b* refers to the owner information associated with the file information on the file B, and determines that the "user Y" which is the owner information on the file C is matched with the "user Y" which is the owner information on the file B. The browse request processing unit 14*b* transmits the browse permission response to the user X.

[Secret File Registration Processing]

Figure 4:
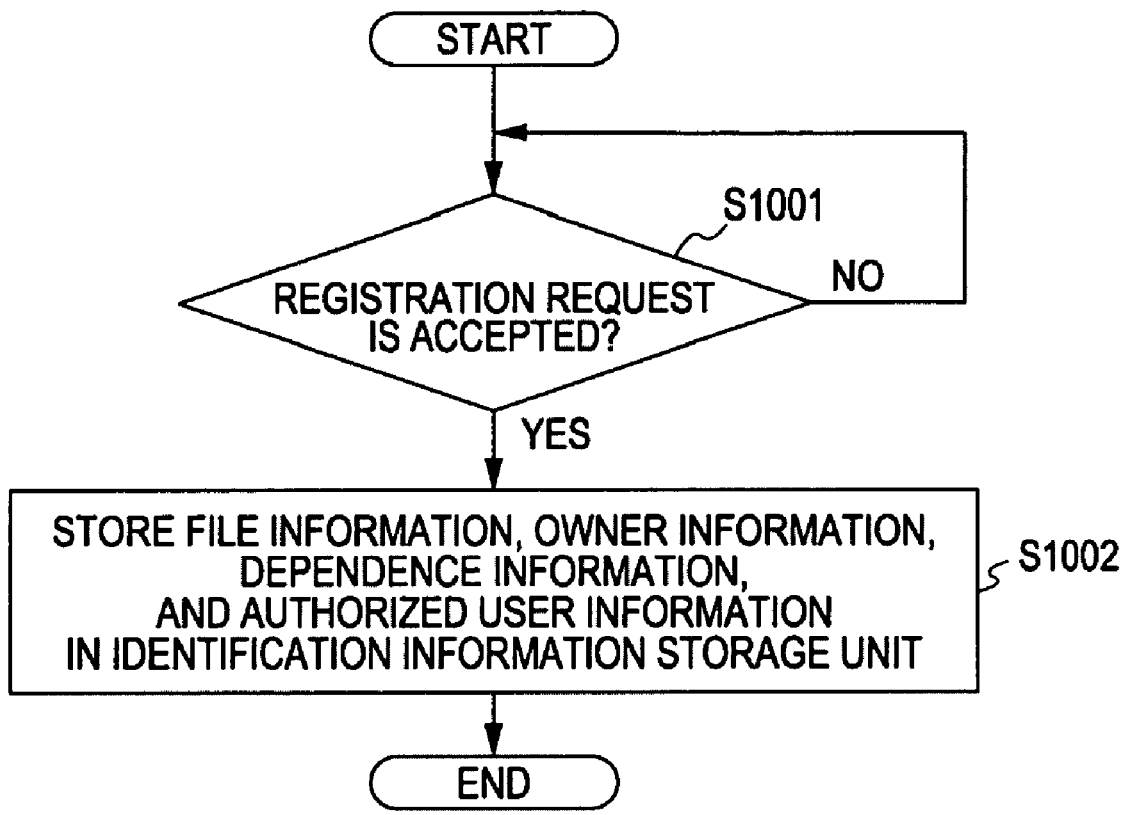
FIG. 4 is a flowchart showing a flow of secret file registration processing.

Secret file registration processing performed by the registration request processing unit 14*a* will be described with reference to FIG. 4. FIG. 4 is a flowchart showing a flow of the secret file registration processing. As shown in FIG. 4, when receiving the request to register the secret file including the file information, owner information, dependence relationship information, and authorized user information from a predetermined user through the input unit 11 (Yes in Step S1001), the registration request processing unit 14*a* stores and associates the file information, dependence relationship information, and authorized user information in the identification information storage unit 13*a* (Step S1002). Then the processing is ended.

[Browse Request Response Processing]

Figure 5:
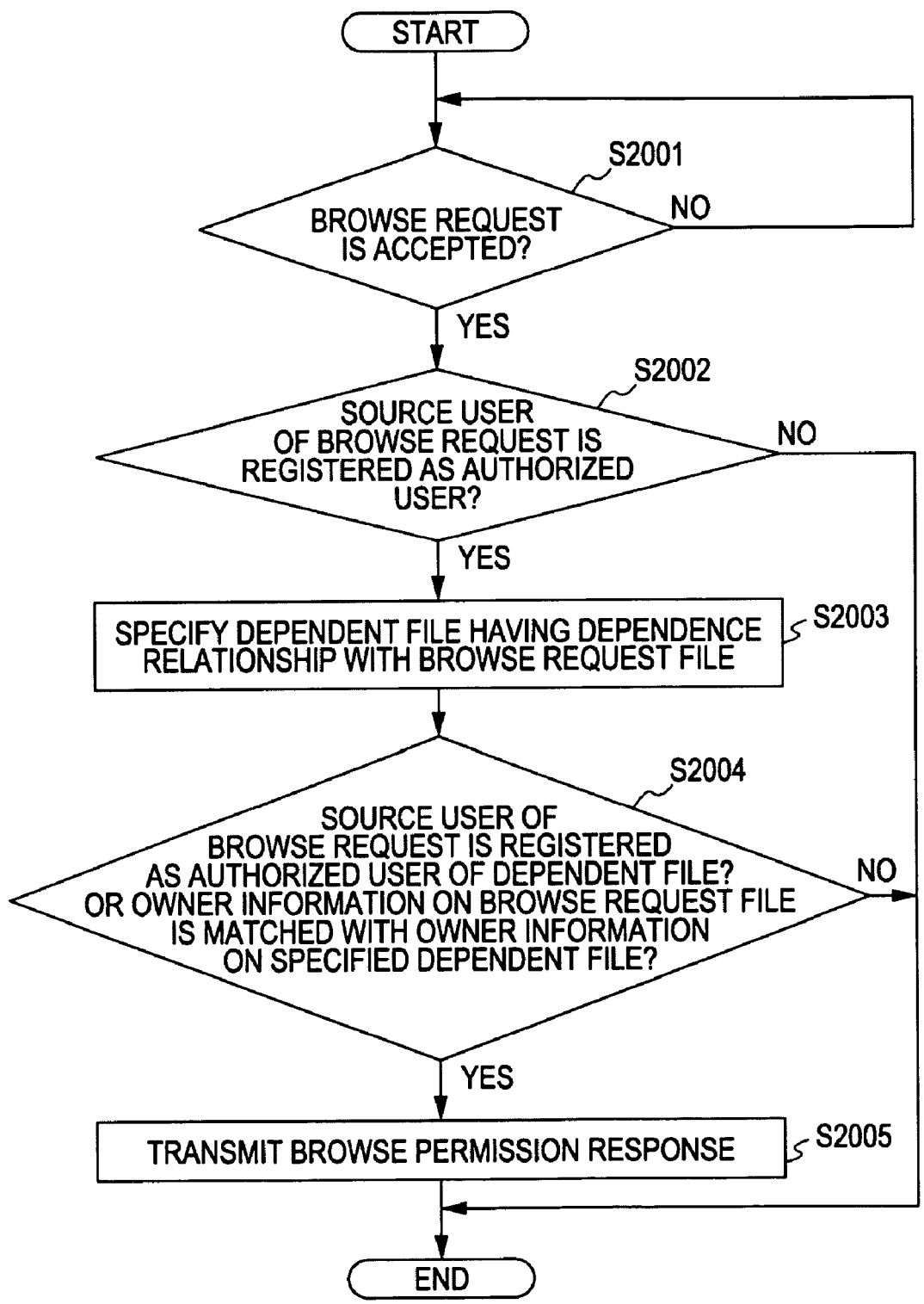
FIG. 5 is a flowchart showing a flow of browse request response processing.

Browse request response processing performed by the browse request processing unit 14*b* will be described with reference to FIG. 5. FIG. 5 is a flowchart showing a flow of the browse request response processing. As shown in FIG. 5, when accepting the request to browse the secret file including the file information on the browse request file from a predetermined user through the input unit 11 (Yes in Step S2001), the browse request processing unit 14*b* determines whether or not the source user of the browse request is registered as the authorized user of the browse request file (Step S2002).

When the source user is not registered as the authorized user of the browse request file (No in Step S2002), the browse request processing unit 14b directly ends the processing.

On the other hand, when the source user is registered as the authorized user (Yes in Step S2002), the browse request processing unit 14b refers to the dependence relationship information which is stored in the identification information storage unit 13a while associated with the file information on the browse request file, and specifies the dependent file having the dependence relationship with the browse request file (Step S2003).

The browse request processing unit 14b determines whether or not the source user of the browse request is registered as the authorized user of the dependent file by referring to the authorized user information associated with the file information for the specified dependent file that is among the information stored in the identification information storage unit 13a, or determines whether or not the owner information on the browse request file is matched with the owner information on the specified dependent file by referring to the owner information stored in the identification information storage unit 13a (Step S2004).

At this point, when the browse request processing unit 14b determines that the source user of the browse request is registered as the authorized user of the dependent file by referring to the authorized user information associated with the file information for the specified dependent file among the pieces of authorized user information stored in the identification information storage 13a, and/or when the browse request processing unit 14b determines that the owner information on the browse request file is matched with the owner information on the specified dependent file by referring to the owner information stored in the identification information storage unit 13a (Yes in Step S2004), the browse request processing unit 14b transmits the browse permission response to the source user (Step S2005). Then the processing is ended.

On the other hand, when the source user of the browse request is not registered as the authorized user of the dependent file, and when the owner information on the browse request file is not matched with the owner information on the specified dependent file (No in Step S2004), the processing is directly ended.

Effect of First Embodiment

As described above, in the first embodiment, the browse permission response can be transmitted to the user who should be permitted to browse the file.

Second Embodiment

In the first embodiment, for the dependent file in which the owner information on the browse request file is not matched with the owner information on the dependent file, when the source user of the browse request is not registered as the authorized user of the dependent file, sometimes the browse permission response cannot be transmitted to the user even if the user should be permitted to browse the file.

For example, it is assumed that the user X is the owner of the file A, the file A has no dependence relationship with other files, and the user X and the user Y are permitted to browse the file A.

It is assumed that the user Y is the owner of the file B, the file B has no dependence relationship with other files, and the user Y and a user Z are permitted to browse the file B.

It is assumed that the user Y is the owner of the file C, the file C has a dependence relationship with the file A and the file B, that is, the file C is produced using the file A and the file B, and the user X, the user Y, and the user Z are permitted to browse the file C.

In such cases, when the request to browse the file C is accepted from the user Z, the browse permission response cannot be transmitted to the user Z.

Therefore in a second embodiment, the browse permission response is transmitted to the user who should be permitted to browse the file by changing the owner information. A configuration of the management apparatus of the second embodiment, a flow of processing performed by the management apparatus, and an effect of the second embodiment are sequentially described below.

Configuration of Management Apparatus of the Second Embodiment

Figure 6:
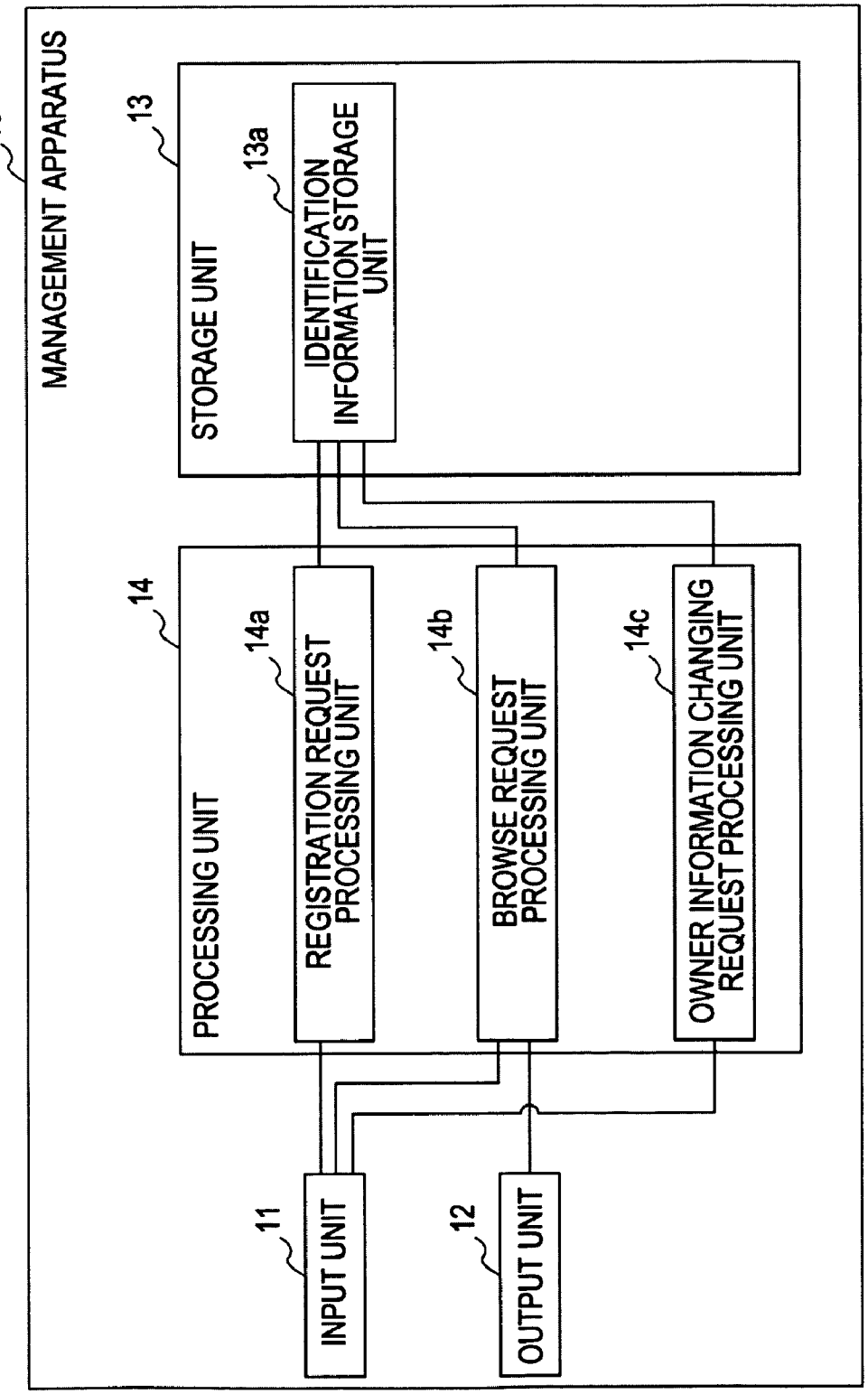
FIG. 6 is a block diagram showing a configuration of a management apparatus according to a second embodiment of the invention.

A configuration of the management apparatus 10 according to a second embodiment of the invention will be described with reference to FIG. 6. FIG. 6 is a block diagram showing the configuration of the management apparatus of the second embodiment. The configuration of the management apparatus 10 of the second embodiment differs from that of the management apparatus 10 of the first embodiment in that an owner information changing request processing unit 14c is newly provided.

When accepting an owner information changing request including the file information and change destination owner information indicating a change destination of the secret file owner from the user who is the secret file owner, the owner information changing request processing unit 14c changes the owner information which is stored in the identification information storage unit 13a while and associated with the received file information to the owner information on the change destination.

Specifically, for example, when accepting the owner information changing request including the file information (for example, file A) and the change destination owner information (for example, user Y) from the user X who is the secret file owner through the input unit 11, the owner information changing request processing unit 14c changes the owner information on the file A stored in the identification information storage unit 13a from the user X to the user Y.

That is, the owner information on the file C is matched with the owner information on the file A by changing the owner of the file A to the user Y, and the browse permission response is transmitted to the user Z who makes the request to browse the file C.

Owner Information Changing Processing

Figure 7:
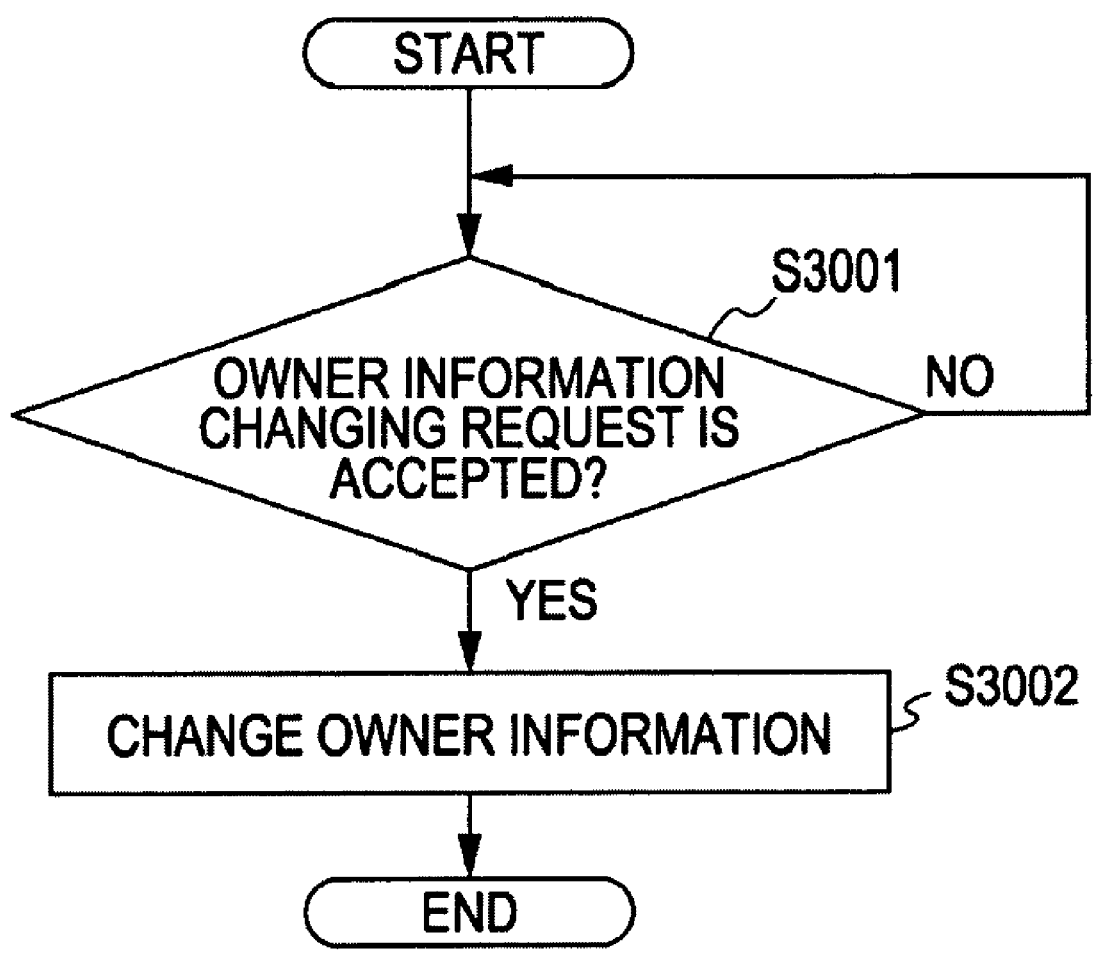
FIG. 7 is a flowchart showing a flow of owner information changing processing.

Owner information changing processing performed by the owner information changing request processing unit 14c will be described with reference to FIG. 7. FIG. 7 is a flowchart showing a flow of the owner information changing processing. As shown in FIG. 7, when the owner information changing request processing unit 14c accepts the owner information changing request (Yes in Step S3001), the owner information changing request processing unit 14c changes the owner information which is stored in the identification information storage unit 13a while and associated with the received file information to the owner information of the change destination (Step S3002), and the processing is ended.

Effect of Second Embodiment

As described above, in the second embodiment, the owner information can be changed to transmit the browse permission response to the user who should be permitted to browse the file.

Third Embodiment

The first and second embodiments have been described heretofore, however, in addition to the first and second embodiments, the invention may be implemented in various modes. A third embodiment will be described below as another embodiment of the invention.

The processing procedure, control procedure, specific name, and information (for example, pieces of information shown in FIG. 3) including various pieces of data and parameters can arbitrarily changed unless otherwise noted.

For example, in the first embodiment, the case of after the determination whether or not the owner information on the browse request file is matched with the owner information on the dependent file, the determination whether or not the source user of the browse request is registered as the authorized user of the dependent file is made for the dependent file whose owner information is not matched with the owner information on the browse request file, has been described. Alternatively, after the determination whether or not the source user of the browse request is registered as the authorized user of the dependent file, the determination whether or not the owner information on the browse request file is matched with the owner information on the dependent file may be made for the dependent file which is not registered to the authorized user.

Each component of each apparatus shown in the drawings is functional concept, and it is not always necessary that the apparatus physically include component as shown in the drawings. That is, the specific mode of dispersion and integration of each apparatus is not limited to the drawings, a part of or all the apparatus can be configured while functionally or physically dispersed or integrated in an arbitrary unit according to various loads and usage states.

For example, the registration request processing unit 14a and the browse request processing unit 14b of FIG. 2 can integrally be configured.

Figure 8:
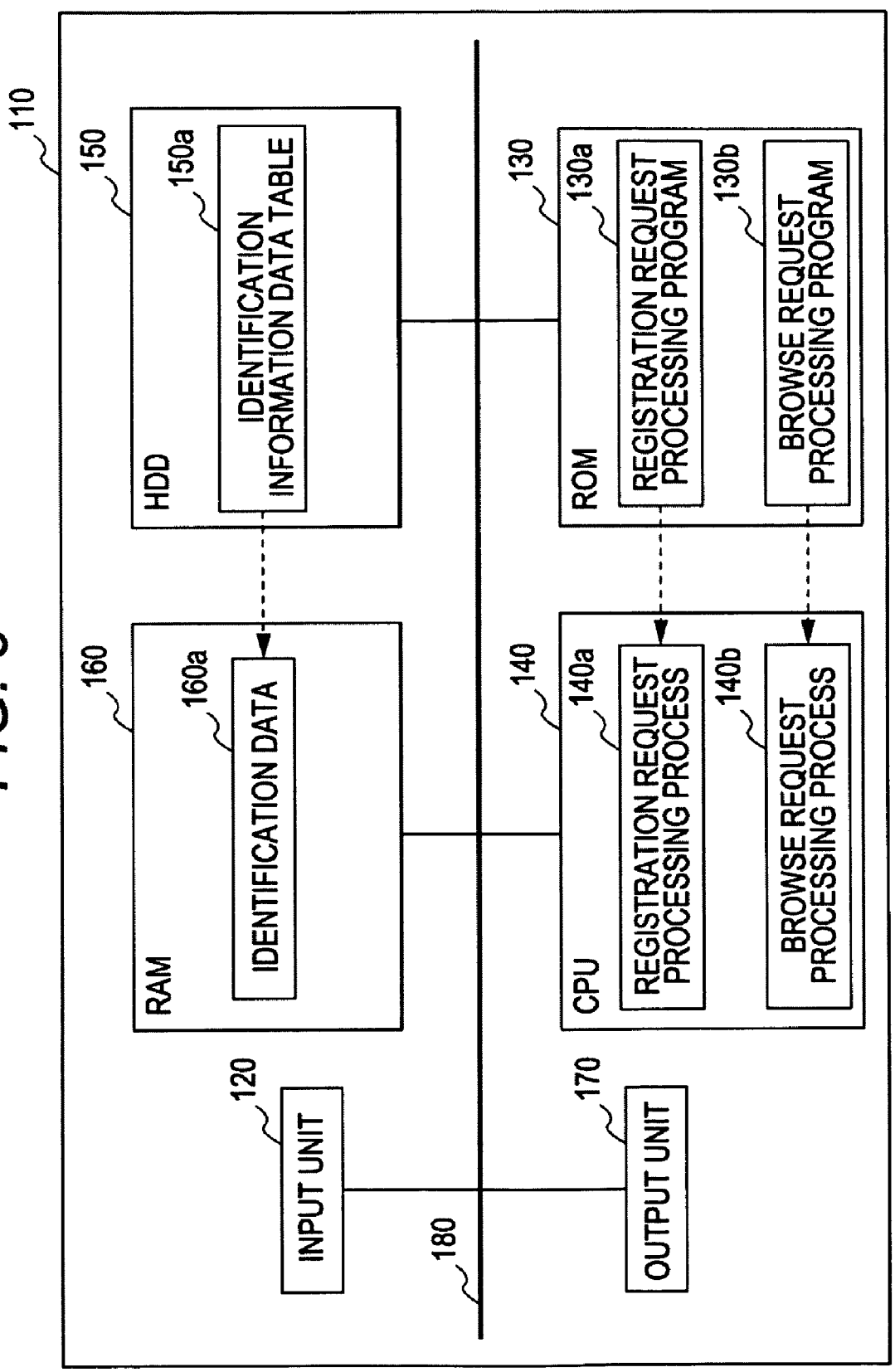
FIG. 8 shows a computer which executes a management program.
Figure 9:
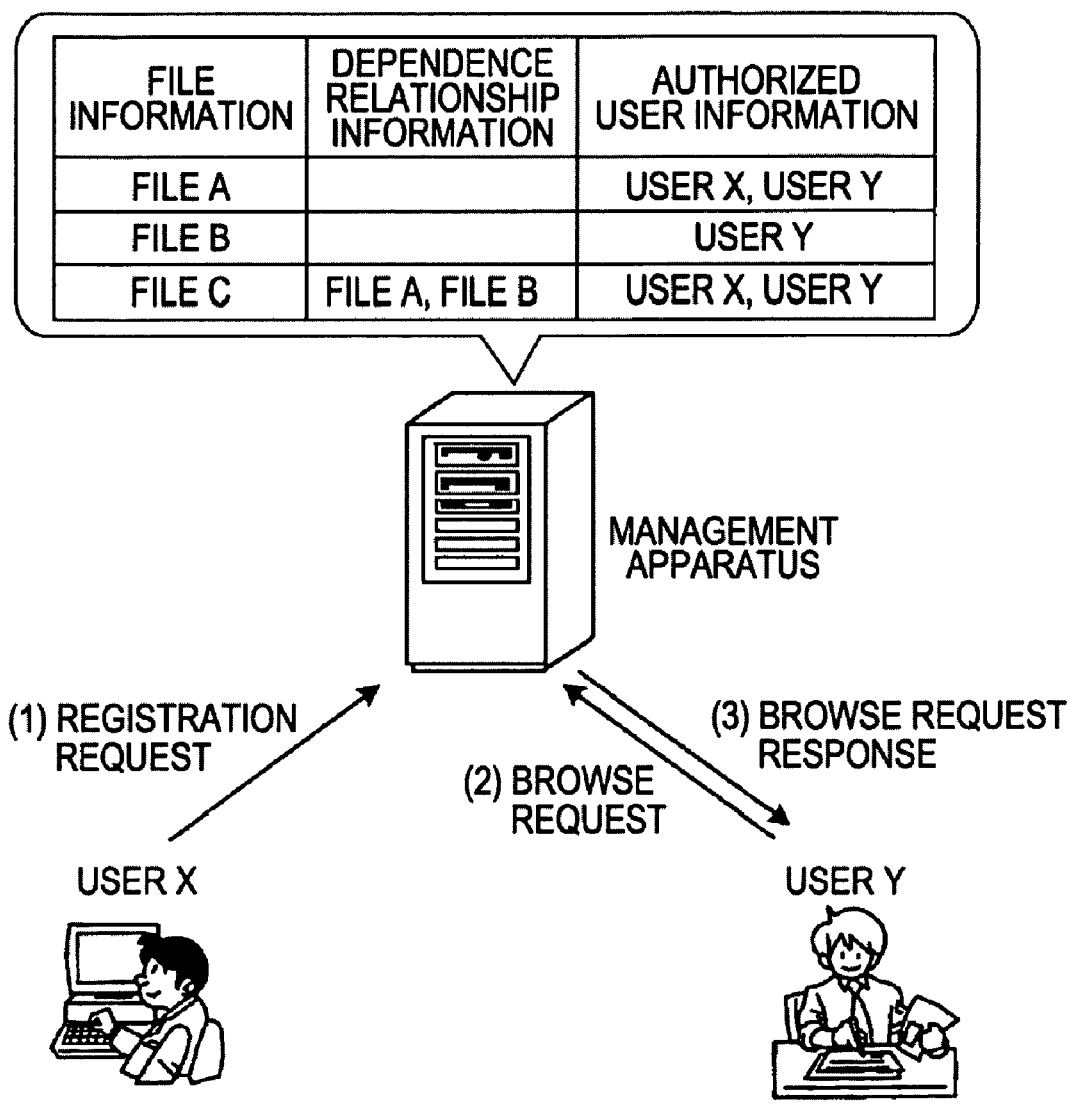
FIG. 9 is a diagram explaining an outline of a conventional management apparatus.

The invention may be realized in such a manner that a computer which is the management apparatus 10 executes a previously prepared program. A computer which executes a management program having the same function as the management apparatus 10 of the embodiments will be described below by way of example with reference to FIG. 8. FIG. 8 shows a computer which executes a management program.

As shown in FIG. 8, a computer 110 which is the management apparatus 10 includes an input unit 120, ROM 130, CPU 140, HDD 150, RAM 160, and an output unit 170. The units are connected to one another through a bus 180.

A management program for exerting the same function as the management apparatus 10 of the first embodiment, that is, a registration request processing program 130a and a browse request processing program 130b are previously stored in ROM 130 as shown in FIG. 8. Similarly to the components of the management apparatus 10 shown in FIG. 2, the program 130a and program 130b may be dispersed or integrated as appropriate.

CPU 140 reads the program 130a and program 130b from the ROM 130 to execute the program 130a and program 130b, whereby the program 130a and program 130b acts as the registration request processing process 140a and the browse request processing process 140b as shown in FIG. 8. The process 140a and process 140b corresponds to the registration request processing unit 14a and the browse request processing unit 14b shown in FIG. 2, respectively. An owner information changing request processing process which is the owner information changing request processing unit 14c of the second embodiment may be included in order to operate the computer 110.

As shown in FIG. 8, an identification information data table 150a is provided in HDD 150. The identification information data table 150a corresponds to the identification information storage unit 13a shown in FIG. 2. CPU 140 reads identification data 160a from the identification information data table 150a, stores the identification data 160a in RAM 160, and performs the processing based on the identification data 160a stored in RAM 160.

It is not always necessary to store the program 130a and program 130b in ROM 130 from the beginning. For example, the program 130a and program 130b are stored in a "portable physical medium" such as a Flexible Disk (FD), a CD-ROM, a DVD disk, a magneto-optical disk, and an IC card which is inserted in the computer 110, a "fixed physical medium" such as HDD provided inside or outside of the computer 110, or "another computer (or server)" connected to the computer 110 through a public telephone line, the Internet, LAN, or WAN, and the computer 110 may read and execute the programs therefrom.

All examples and conditional language recited herein are intended for pedagogical purpose to aid the reader in understanding the principles of the invention and the concepts contributed by the inventor to furthering the art, and are to be construed as being without limitation to such specifically recited examples and conditions, nor does the organization of such examples in the specification related to a showing of the superiority and inferiority of the invention. Although the embodiment(s) of the present invention has been described in detail, it should be understood that the various changes, substitutions, and alterations could be made hereto without departing from the spirit and scope of the invention.

What is claimed is:

1. A management apparatus comprising:
a memory to store owner information, dependence relationship information, and authorized user information associated with file information identifying a secret file; and
a processor coupled to the memory;
the processor operates to at least:
store file access information including owner information indicating an owner of the targeted file, dependence relationship information, and authorized user information with file information, the file information being used to identify the secret file, the owner information being used to identify an owner of the secret file, the dependence relationship information indicating a dependence relationship between the secret file and another secret file, the authorized user information being used to identify the authorized user;
first determine whether a source user of a browse request is registered as the authorized user of a browse request file by referring to the authorized user information stored while associated with file information of the browse request file that is associated with the browse request;

specify one of a plurality of dependent files having a dependence relationship with the browse request file by referring to the dependence relationship information associated with the file information on the browse request file, when the source user is determined as the authorized user;

second determine whether the owner information on the browse request file is matched with the owner information on the dependent file specified in the specifying;

third determine whether the source user of the browse request is registered as the authorized user of the dependent file by referring to the authorized user information associated with the specified dependent file when the owner information on the browse request file is not matched with the owner information on the dependent file in the second determining; and transmit a browse permission response to the source user based on at least one of the following conditions, namely (1) when the source user is registered as the authorized user of the dependent file in the third determine, and (2) when the owner information on the browse request file is matched with the owner information on the dependent file in the second determine.

2. The management apparatus according to claim 1, the processor further operates to change the owner information stored in the memory to owner information of a change destination, when an owner information changing request is accepted from a user who is a secret file owner, the owner information changing request including the file information and the owner information of the change destination indicating a change destination of a targeted file owner.

3. A computer-readable non-transitory medium comprising machine-executable instructions for performing a method, execution of which by a machine facilitates acceptance of a browse request from a user vis-à-vis a targeted file and in response selectively transmits a browse permission response including information necessary to browse the targeted file, the method including:

storing file access information including owner information indicating an owner of the targeted file, dependence relationship information indicating a dependence relationship between the targeted file and a plurality of dependent files, authorized user information indicating authorized users of the targeted file, and file information identifying the targeted file;

first determining whether a source user that originates the browse request is registered as the authorized user of the targeted file by referring to the file access information;

selectively specifying one of the plurality of dependent files having a dependence relationship with the targeted file specified by the browse request file by referring to the dependence relationship information in association with the file information of the targeted file specified by the browse request file, when the source user is determined as the authorized user;

second determining whether the owner information on the browse request file is matched with the owner information on the dependent file specified in the specifying;

third determining whether the source user of the browse request is registered as the authorized user of the dependent file by referring to the authorized user information associated with the specified dependent file when the owner information on the browse request file is not matched with the owner information on the dependent file in the second determining; and transmitting the browse permission response to the source user based on at least one of the following conditions, namely (1) when the source user of the browse request is registered as the authorized user of the dependent file in the third determining, and (2) when the owner information on the browse request file is matched with the owner information on the dependent file in the second determining.

4. A method for facilitating acceptance of a browse request from a user to browse a secret file and transmitting information necessary to browse the secret file as a browse permission response to an authorized user who should be permitted to browse the secret file, the method comprising:

storing and associating owner information, dependence relationship information, and authorized user information with file information, the file information being used to identify the secret file, the owner information being used to identify an owner of the secret file, the dependence relationship information indicating a dependence relationship between the secret file and another secret file, the authorized user information being used to identify the authorized user;

first determining whether a source user of the browse request is registered as the authorized user of a browse request file by referring to the authorized user information stored while associated with file information of a browse request file that is associated with the browse request;

specifying one of a plurality of dependent files having a dependence relationship with the browse request file by referring to the dependence relationship information associated with the file information on the browse request file, when the source user is determined as the authorized user;

second determining whether the owner information on the browse request file is matched with the owner information on the dependent file specified in the specifying;

third determining whether the source user of the browse request is registered as the authorized user of the dependent file by referring to the authorized user information associated with the specified dependent file when the owner information on the browse request file is not matched with the owner information on the dependent file in the second determining; and transmitting the browse permission response to the source user based on at least one of the following conditions, namely (1) when the source user of the browse request is registered as the authorized user of the dependent file in the third determining, and (2) when the owner information on the browse request file is matched with the owner information on the dependent file in the second determining.

* * * * *